(12) United States Patent
Kim

(10) Patent No.: US 11,204,250 B2
(45) Date of Patent: Dec. 21, 2021

(54) METHOD AND SERVER FOR PROVIDING ROUTE INFORMATION FOR SHIP INCLUDING COASTAL WEATHER INFORMATION

(71) Applicant: Weatheri Inc., Seoul (KR)

(72) Inventor: Young Doh Kim, Seoul (KR)

(73) Assignee: Weatheri Inc.

( * ) Notice: Subject to any disclaimer, the term of this patent is extended or adjusted under 35 U.S.C. 154(b) by 362 days.

(21) Appl. No.: 16/152,373

(22) Filed: Oct. 4, 2018

(65) Prior Publication Data
US 2020/0088522 A1   Mar. 19, 2020

(30) Foreign Application Priority Data

Sep. 13, 2018   (KR) .................. 10-2018-0109511

(51) Int. Cl.
| | |
|---|---|
| *G01C 21/20* | (2006.01) |
| *G06N 5/04* | (2006.01) |
| *G01W 1/10* | (2006.01) |
| *G06N 20/00* | (2019.01) |

(Continued)

(52) U.S. Cl.
CPC ............ *G01C 21/203* (2013.01); *G01W 1/10* (2013.01); *G06F 30/20* (2020.01); *G06N 5/04* (2013.01); *G06N 20/00* (2019.01); *G06F 2111/10* (2020.01)

(58) Field of Classification Search
None
See application file for complete search history.

(56) References Cited

U.S. PATENT DOCUMENTS

| | | | |
|---|---|---|---|
| 6,701,250 B1 * | 3/2004 | Rychlak | G01C 21/3415 340/990 |
| 7,516,011 B1 * | 4/2009 | Kabel | G01C 21/20 340/995.19 |

(Continued)

FOREIGN PATENT DOCUMENTS

| | | | |
|---|---|---|---|
| JP | H8-338739 A | | 12/1996 |
| JP | 2008145312 | * | 6/2008 |
| JP | 2014-119356 A | | 6/2014 |

(Continued)

OTHER PUBLICATIONS

Sangwook Park1, Jong-Suk Park2 and Tae-Ryong Kim1, Trapped-Fetch Wave Model Application to Typhoon Case, https://www.sciencedirect.com/science/article/pii/S2225603218300481 (Year: 2012).*

(Continued)

*Primary Examiner* — Navid Ziaeianmehdizadeh
(74) *Attorney, Agent, or Firm* — LEEPI

(57) ABSTRACT

The present disclosure provides a method for providing route information for ship including coastal weather information, including: determining a standard route based on information about the origin and destination, determining at least one alternative route based on filtering information and the information about the origin and destination received from a user, and providing the user device with information about the standard route and the at least one alternative route such that the standard route and the at least one alternative route are output on a screen of the user device for comparison.

14 Claims, 13 Drawing Sheets

(51) Int. Cl.
   *G06F 30/20*        (2020.01)
   *G06F 111/10*       (2020.01)

(56) References Cited

U.S. PATENT DOCUMENTS

2014/0156806 A1\* 6/2014 Karpistsenko ......... G06Q 50/28
                                                        709/219
2018/0038994 A1\* 2/2018 Hamann ................ G01W 1/10

FOREIGN PATENT DOCUMENTS

| JP | 2017-187371 A |   | 10/2017 |
|----|---------------|---|---------|
| KR | 20110103082   | \* | 9/2011  |
| KR | 20150072808   | \* | 6/2015  |
| KR | 10-1556723 B1 |   | 9/2015  |

OTHER PUBLICATIONS

Machine Translation of KR-20110103082 (Year: 2011).\*

\* cited by examiner

*FIG. 3F*

| | | 20161026 | | | | | | |
|---|---|---|---|---|---|---|---|---|
| | | 3 | 6 | 9 | 12 | 15 | 18 | 21 | 24 |
| Wave Direction | W | W | W | WNW | WNW | NE | ENE | E |
| Sig. Wave Height | 0.6 | 0.5 | 0.4 | 0.3 | 0.3 | 0.5 | 0.9 | 1.1 |
| Max. Wave Height | | | | | | | | |
| Wave Period | 5.2 | 5.1 | 4.0 | 4.6 | 4.5 | 2.9 | 4.1 | 5.1 |
| Swell Direction | NNW | NNW | WSW | NNW | NW | NW | NW | NW |
| Swell Height | 0.5 | 0.4 | 0.2 | 0.2 | 0.2 | 0.2 | 0.1 | 0.1 |
| Swell Period | 5.4 | 5.3 | 4.7 | 4.9 | 4.6 | 4.5 | 4.6 | 4.6 |
| Wind Wave Direction | W | W | W | WNW | WNW | NE | ENE | E |
| Wind Wave Height | 0.6 | 0.5 | 0.4 | 0.3 | 0.3 | 0.5 | 0.9 | 1.1 |
| Wind Wave Period | 5.2 | 5.1 | 4.0 | 4.6 | 4.5 | 2.9 | 4.1 | 5.1 |
| Wind Direction | NNE | NNW | N | ENE | ENE | NE | ENE | ENE |
| Wind Speed | 6.5 | 5.5 | 7.0 | 7.5 | 8.1 | 11.1 | 11.5 | 10.5 |
| Visibility | 13.0 | 13.0 | 12.5 | 11.5 | 11.5 | 11.5 | 12.5 | 13.5 |
| Pressure | 1017 | 1017 | 1016 | 1020 | 1020 | 1020 | 1021 | 1022 |
| Air Temp. | 19.7 | 18.6 | 17.1 | 17.1 | 17.6 | 17.7 | 17.6 | 19.6 |

FIG. 3G

METHOD AND SERVER FOR PROVIDING ROUTE INFORMATION FOR SHIP INCLUDING COASTAL WEATHER INFORMATION

CROSS-REFERENCE TO RELATED APPLICATION

This application claims the benefit under 35 USC 119(a) of Korean Patent Application No. 10-2018-0109511 filed on Sep. 13, 2018 in the Korean Intellectual Property Office, the entire disclosures of which are incorporated herein by reference for all purposes.

TECHNICAL FIELD

The present disclosure relates to a method and server for providing route information for ship including coastal weather information.

BACKGROUND

Ship is a general term for structures capable of moving on water or more broadly for means of transportation on water. A vessel is supplied with navigation information by a ship routing system using an electronic navigation chart.

It is not easy to determine a ship route because more factors (e.g., wave height, wind speed, wind power, size and speed of a ship, and the like) need to be considered for ship route than for overland route. Accordingly, only a few route determination services have been commercialized.

Further, conventional route determination services have searched and provided only the shortest path on an electronic navigation chart but have not provided a route search service that satisfies route conditions desired by a user.

Meanwhile, coastal disasters such as damage to coast structures, coastal flooding, oil pollution accident, and the like are closely related to sea conditions and flows of seawater. Therefore, an accurate prediction about sea conditions and flows of seawater in coastal waters is very important not only for the marine industry, but also for protection of coastal areas, search and rescue in case of a marine accident, and estimation of oil spreading.

Many studies on the improvement in accuracy of prediction of coastal weather were conducted until recently. However, due to lack of marine weather experts and marine numerical weather prediction models, land weather experts have predicted marine weather. Therefore, expertise in the prediction of coastal weather is remarkably lower than in the prediction of land weather.

Further, various kinds of weather information provided from multiple marine numerical weather prediction models are different from each other in prediction accuracy rate. Each of the multiple marine numerical weather prediction models provides weather information of a location requested by a user device without correction, and, thus, the accuracy of the weather information of the location is reduced.

PRIOR ART DOCUMENT

[Patent Document]
(Patent Document 1) Korean Patent No. 10-1556723 (date of patent: Sep. 23, 2015)

SUMMARY

In view of the foregoing, the present disclosure is conceived to generate coastal weather information of each of the origin and destination of a ship based on real-time observed values received from multiple marine numerical weather prediction models, respectively, and provide a user device with the generated coastal weather information of each of the origin and destination of the ship. Further, the present disclosure is conceived to determine a standard route based on information about the origin and destination, determine at least one alternative route based on filtering information and the information about the origin and destination received from a user, and provide the user device with information about the standard route and the at least one alternative route such that the standard route and the at least one alternative route are output on a screen of the user device for comparison. However, problems to be solved by the present disclosure are not limited to the above-described problems. There may be other problems to be solved by the present disclosure.

According to a first aspect of the present disclosure, a method for providing route information for ship including coastal weather information includes: receiving real-time observed values from multiple marine numerical weather prediction models, respectively; receiving information about an origin and a destination from a user device; receiving filtering information including at least one limiting condition from the user device; generating first coastal weather information of a coastal area corresponding to the origin and second coastal weather information of a coastal area corresponding to the destination based on the real-time observed values; determining a standard route from the origin to the destination and determining at least one alternative route from the origin to the destination based on the received filtering information; and transmitting the first coastal weather information and the second coastal weather information to the user device and transmitting information about the standard route and the at least one alternative route to the user device such that the standard route and the at least one alternative route are output on a screen of the user device for comparison, and the at least one alternative route may be a route satisfying the at least one limiting condition.

According to a second aspect of the present disclosure, a server for providing route information for ship including coastal weather information includes: an observed value receiving unit configured to receive real-time observed values from multiple marine numerical weather prediction models, respectively; a port information receiving unit configured to receive information about an origin and a destination from a user device; a filtering information input unit configured to receive filtering information including at least one limiting condition from the user device; a coastal weather information generation unit configured to generate first coastal weather information of a coastal area corresponding to the origin and second coastal weather information of a coastal area corresponding to the destination based on the real-time observed values; a route determination unit configured to determine a standard route from the origin to the destination and determine at least one alternative route from the origin to the destination based on the received filtering information; and a route information transmission unit configured to transmit the first coastal weather information and the second coastal weather information to the user device and transmit information about the standard route and the at least one alternative route to the user device such that the standard route and the at least one alternative route are output on a screen of the user device for comparison, and the at least one alternative route may be a route satisfying the at least one limiting condition.

The above-described aspects are provided by way of illustration only and should not be construed as liming the present disclosure. Besides the above-described embodiments, there may be additional embodiments described in the accompanying drawings and the detailed description.

According to the present disclosure, it is possible to generate coastal weather information of each of the origin and destination of a ship based on real-time observed values received from multiple marine numerical weather prediction models, respectively, and provide a user device with the generated coastal weather information of each of the origin and destination of the ship. Further, it is possible to determine a standard route based on information about the origin and destination, determine at least one alternative route based on filtering information and the information about the origin and destination received from a user, and provide the user device with information about the standard route and the at least one alternative route such that the standard route and the at least one alternative route are output on a screen of the user device for comparison. Therefore, it is possible to provide a user with a wider range of choices of routes and it is possible for the user to receive a route satisfying sailing conditions desired by the user. Therefore, it is possible for the user to plan an optimum route of the ship.

Further, according to the present disclosure, a real-time observed value is received from a marine numerical weather prediction model with high prediction accuracy rate allocated to each kind of the weather information to generate coastal weather information. Therefore, it is possible to improve the accuracy and reliability of weather information.

Furthermore, according to the present disclosure, it is possible to provide the user device with coastal weather information of each of the origin and destination of a ship. Therefore, it is possible for the user to determine a sailing date based on the coastal weather information.

Moreover, according to the present disclosure, it is possible to determine the optimum sailing date with good coastal weather information based on the coastal weather information of each of the origin and destination of the ship, and it is possible to provide the user device with the determined optimum sailing date and information about a standard route and at least one alternative route for the optimum sailing date.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 3A to FIG. 3I are diagrams provided to explain a method for providing route information for ship in accordance with various embodiments described herein.

DETAILED DESCRIPTION

Figure 1:
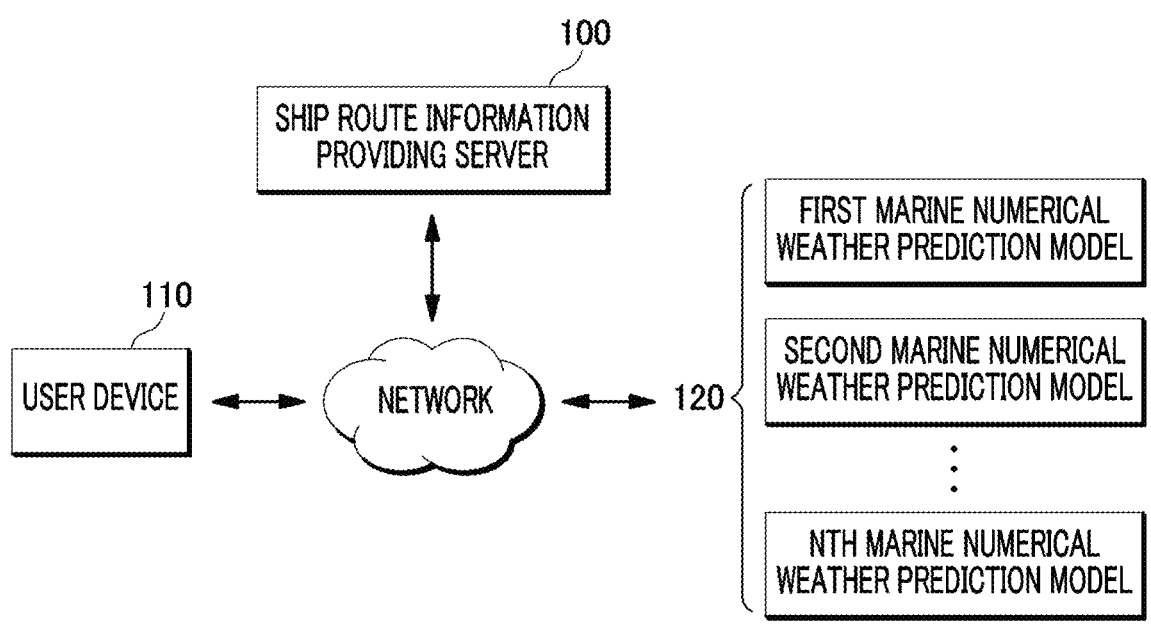
FIG. 1 is a configuration view of a ship route information providing system in accordance with various embodiments described herein.

Hereinafter, embodiments of the present disclosure will be described in detail with reference to the accompanying drawings so that the present disclosure may be readily implemented by those skilled in the art. However, it is to be noted that the present disclosure is not limited to the embodiments but can be embodied in various other ways. In drawings, parts irrelevant to the description are omitted for the simplicity of explanation, and like reference numerals denote like parts through the whole document.

Through the whole document, the term "connected to" or "coupled to" that is used to designate a connection or coupling of one element to another element includes both a case that an element is "directly connected or coupled to" another element and a case that an element is "electronically connected or coupled to" another element via still another element. Further, it is to be understood that the term "comprises or includes" and/or "comprising or including" used in the document means that one or more other components, steps, operation and/or existence or addition of elements are not excluded in addition to the described components, steps, operation and/or elements unless context dictates otherwise.

In the present specification, the term "unit" includes a unit implemented by hardware, a unit implemented by software, and a unit implemented by both of them. One unit may be implemented by two or more pieces of hardware, and two or more units may be implemented by one piece of hardware.

In the present specification, some of operations or functions described as being performed by a device may be performed by a server connected to the device. Likewise, some of operations or functions described as being performed by a server may be performed by a device connected to the server.

Hereinafter, details for carrying out the present disclosure will be described with reference to the accompanying drawings.

FIG. 1 is a configuration view of a ship route information providing system in accordance with an embodiment of the present disclosure.

Referring to FIG. 1, the ship route information providing system may include a ship route information providing server 100 and a user device 110. Herein, the ship route information providing system illustrated in FIG. 1 is just an embodiment of the present disclosure. Therefore, the present disclosure is not limited to FIG. 1 and other configurations different from that of FIG. 1 can be made according to various embodiments of the present disclosure.

The components of the ship route information providing system illustrated in FIG. 1 are typically connected to each other via a network (not illustrated). The network (not illustrated) refers to a connection structure that enables information exchange between nodes such as devices and servers and may include LAN (Local Area Network), WAN (Wide Area Network), Internet (WWW: World Wide Web), a wired or wireless data communication network, a telecommunication network, a wired or wireless television network, and the like. Examples of the wireless data communication network may include 3G, 4G, 5G, 3GPP (3rd Generation Partnership Project), LTE (Long Term Evolution), WIMAX (World Interoperability for Microwave Access), Wi-Fi, Bluetooth communication, infrared communication, ultrasonic communication, VLC (Visible Light Communication), LiFi, and the like, but may not be limited thereto.

The ship route information providing server 100 may receive real-time observed values from multiple marine numerical weather prediction models 120, respectively. Herein, the multiple marine numerical weather prediction models 120 may include, for example, a CoWW3 model (Coastal Wave Model), a GoWW3 model (Global Wave Model), and a WW3 model (WaveWatch3).

The user device 110 may receive information about the origin and destination of a ship from a user through a ship route information providing site or a ship route providing application and transmit the received information about the origin and destination of the ship to the ship route information providing server 100.

The user device 110 may receive filtering information including at least one limiting condition from the user and transmit the received filtering information to the ship route information providing server 100. Herein, the at least one limiting condition may include at least one of, for example, kind of a ship, size of a ship, speed of a ship, wave height, wind speed, and wind power.

The ship route information providing server 100 may generate first coastal weather information of a coastal area corresponding to the origin and second coastal weather information of a coastal area corresponding to the destination based on the real-time observed values received from the multiple marine numerical weather prediction models 120.

The ship route information providing server 100 may determine a standard route from the origin to the destination and determine at least one alternative route from the origin to the destination based on the received filtering information. Herein, the standard route may refer to a shortest route regardless of the at least one limiting condition and the at least one alternative route may refer to a route satisfying the at least one limiting condition.

The ship route information providing server 100 may transmit the first coastal weather information and the second coastal weather information to the user device 110 and transmit information about the standard route and the at least one alternative route to the user device 110 such that the standard route and the at least one alternative route are output on a screen of the user device 110 for comparison.

The ship route information providing server 100 may determine the optimum sailing date based on the first coastal weather information and the second coastal weather information and determine a standard route and at least one alternative route for the optimum sailing date.

The ship route information providing server 100 may transmit the determined optimum sailing date and information about the standard route and the at least one alternative route for the optimum sailing date to the user device 110.

Conventional route determination systems have provided only the shortest route, and, thus, the user is limited in selecting a route. However, according to the present disclosure, it is possible to provide various routes, such as a standard route and at least one alternative route, which can be selected by the user and it is also possible to provide the user with a route satisfying sailing conditions desired by the user, and, thus, the user can plan an optimum route of a ship.

Further, according to the present disclosure, the first coastal weather information and the second coastal weather information are provided to the user, and, thus, the user can determine the sailing date using the first coastal weather information and the second coastal weather information or the ship route information providing server 100 can determine the optimum sailing date.

Hereinafter, the operations of the components of the ship route information providing system illustrated in FIG. 1 will be described in more detail.

Figure 2:
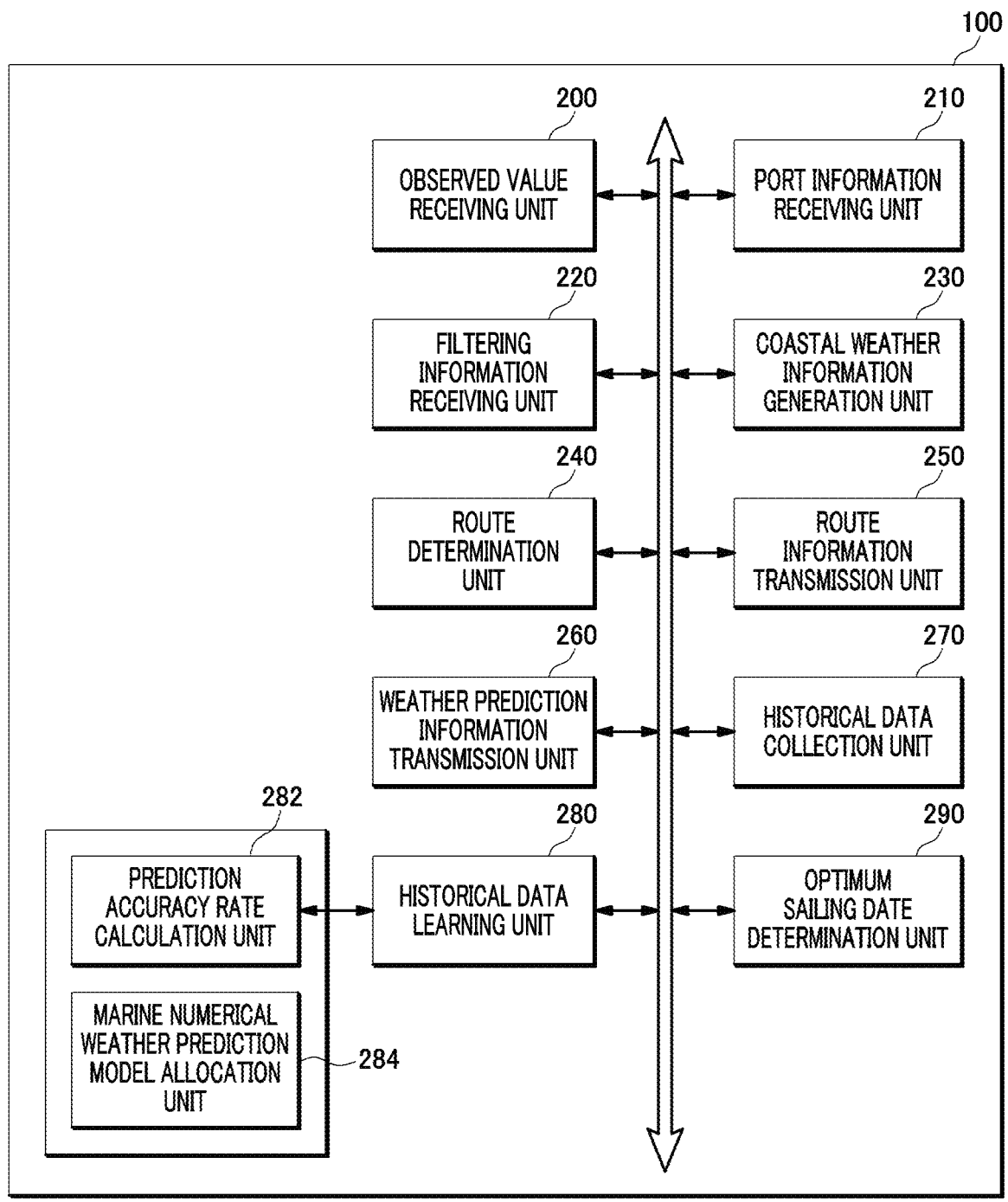
FIG. 2 is a block diagram showing the ship route information providing server illustrated in FIG. 1 in accordance with various embodiments described herein.

FIG. 2 is a block diagram showing the ship route information providing server 100 illustrated in FIG. 1 in accordance with an embodiment of the present disclosure.

Referring to FIG. 2, the ship route information providing server 100 may include an observed value receiving unit 200, a port information receiving unit 210, a filtering information receiving unit 220, a coastal weather information generation unit 230, a route determination unit 240, a route information transmission unit 250, a weather prediction information transmission unit 260, a historical data collection unit 270, a historical data learning unit 280, and an optimum sailing date determination unit 290. Herein, the historical data learning unit 280 may include a prediction accuracy rate calculation unit 282 and a marine numerical weather prediction model allocation unit 284. However, the ship route information providing server 100 illustrated in FIG. 2 is just an embodiment of the present disclosure and can be modified in various ways based on its components illustrated in FIG. 2.

Hereinafter, explanation will be given with reference to FIG. 3A to FIG. 3I.

The historical data collection unit 270 may collect historical weather data from each of the multiple marine numerical weather prediction models 120. Herein, the historical weather data may be in the form of, for example, special weather bulletins, running commentary, and prediction/forecast. Herein, the multiple marine numerical weather prediction models 120 may be a system configured to provide observed values for predicting weather information. The multiple marine numerical weather prediction models 120 may include, for example, a CoWW3 model, a GoWW3 model, and a WW3 model which is a U.S. marine numerical weather prediction model.

The historical data learning unit 280 may learn the collected historical weather data and allocate one of the multiple marine numerical weather prediction models 120 to each kind of the weather information. Herein, the kinds of weather information may include, for example, wave direction, mean wave height, maximum wave height, wave period, wind direction, wind speed, visibility, atmospheric pressure, and temperature. For example, the historical data learning unit 280 may select a marine numerical weather prediction model with prediction accuracy rate for wave direction information during a predetermined past period of time and a marine numerical weather prediction model with high prediction rate for mean wave height from among the multiple marine numerical weather prediction models 120.

The prediction accuracy rate calculation unit 282 may calculate a prediction accuracy rate for each kind of the weather information with respect to each of the multiple marine numerical weather prediction models 120.

The marine numerical weather prediction model allocation unit 284 may allocate each of the multiple marine numerical weather prediction models 120 with the highest prediction accuracy rate for each kind of the weather information. For example, if a first marine numerical weather prediction model has the highest prediction accuracy rate for wave direction, the marine numerical weather prediction model allocation unit 284 may allocate weather information about wave direction to the first marine numerical weather prediction model, and if a second marine numerical weather prediction model has the highest prediction accuracy rate for atmospheric pressure, the marine numerical weather prediction model allocation unit 284 may allocate weather information about atmospheric pressure to the second marine numerical weather prediction model.

The observed value receiving unit 200 may receive real-time observed values from the multiple marine numerical weather prediction models 120, respectively. The observed value receiving unit 200 may receive a real-time observed value of each weather information with respect to a marine numerical weather prediction model 120 allocated to each kind of the weather information. For example, the observed value receiving unit 200 may receive a real-time observed value of wave direction from the first marine numerical weather prediction model and a real-time observed value of atmospheric pressure from the second marine numerical weather prediction model.

Meanwhile, the port information receiving unit 210 may receive location information (including latitude and longitude) for a location, whose weather information needs to be predicted, from the user device 110.

If the port information receiving unit 210 receives location information for a location, whose weather information needs to be predicted, from the user device 110, the port information receiving unit 210 may correct the location information received from the user device 110 depending on each of the multiple marine numerical weather prediction models 120 based on the weather data learned by the historical data learning unit 280

The coastal weather information generation unit 230 may generate weather information of a coastal area corresponding to the location information based on the real-time observed values. Herein, the weather information of the coastal area corresponding to the location information may include multiple kinds of weather information. Each of the multiple kinds of weather information may be information based on a real-time observed value received from a marine numerical weather prediction model 120 allocated to each kind of the weather information. For example, the coastal weather information generation unit 230 may generate weather information about each of wave direction, mean wave height, maximum wave height, wave period, wind direction, wind speed, visibility, atmospheric pressure, and temperature observed at the location in the location information.

The weather prediction information transmission unit 260 may provide the user device 110 with the generated weather information. For example, the weather prediction information transmission unit 260 may provide the user device 110 with the generated weather information in the form of at least one of text, radar image, table, graph, and image.

Figure 3A:
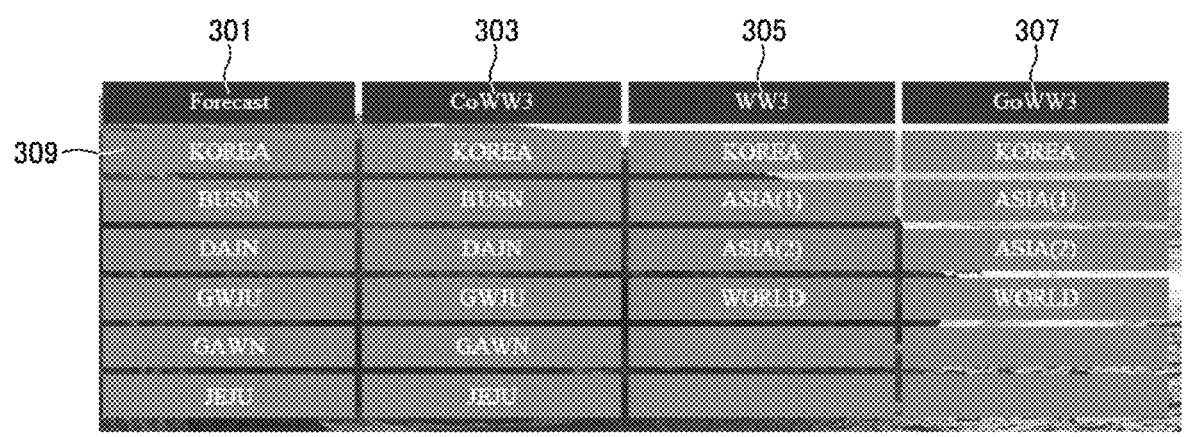
Figure 3B:
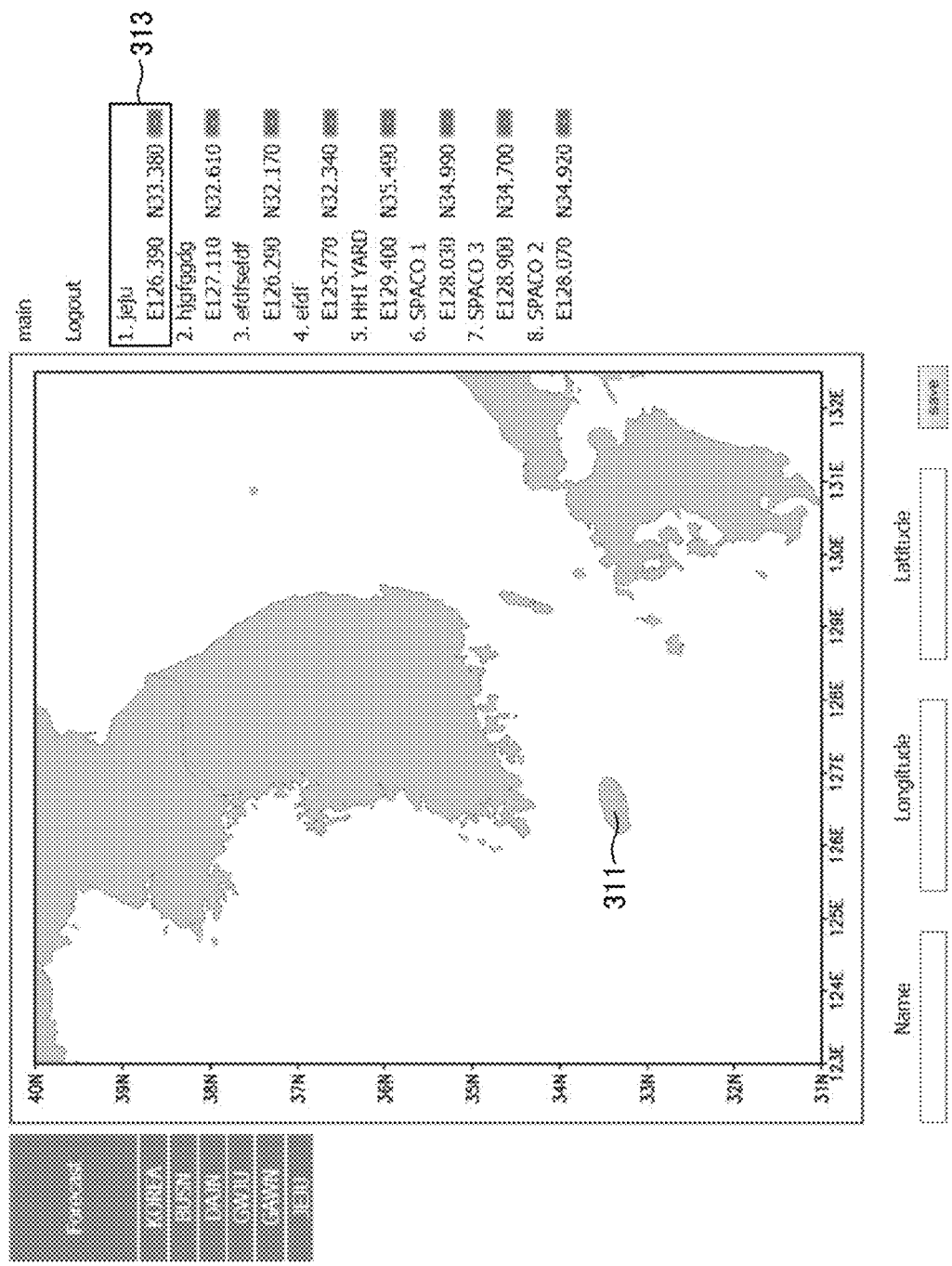

Referring to FIG. 3A and FIG. 3B, the ship route information providing server 100 may provide a weather information prediction service applied with the multiple marine numerical weather prediction models 120 through a ship route information providing site. For example, the ship route information providing server 100 may provide a weather information prediction service based on a weather information prediction item selected by the user from among a weather information prediction item 301 depending on location information combined with the multiple marine numerical weather prediction models 120 and weather information prediction items 303, 305, and 307 depending on the kind of a marine numerical weather prediction model 120.

If the user device 110 selects Korean coastal area (as the origin or destination), the ship route information providing server 100 may provide the user device 110 with a screen where a Korean map is displayed.

If the user selects a location 311 (as the origin or destination), whose weather information needs to be provided, from the Korean map, the ship route information providing server 100 may receive location information 313 including the longitude and latitude of the selected location 311 from the user device 110 and transmit weather information of a coastal area corresponding to the location information 313 to the user device 110. Herein, the weather information of the coastal area corresponding to the location information 313 may be generated based on a real-time observed value for a corrected location received from a marine numerical weather prediction model 120 allocated to each kind of the weather information. For example, weather information about wave direction may be generated based on a real-time observed value of wave direction received from the first marine numerical weather prediction model with the highest prediction accuracy rate for wave direction, and weather information about wind direction may be generated based on a real-time observed value of wind direction received from a third marine numerical weather prediction model with the highest prediction accuracy rate for wind direction.

Referring to FIG. 2 again, the port information receiving unit 210 may receive information about the origin and destination of a ship from the user device 110. For example, the information about the origin of the ship may include a port name of the origin port where the ship departs or latitude and longitude information of the origin port, and the information about the destination of the ship may include a port name of the destination port where the ship arrives or latitude and longitude information of the destination port.

Figure 3C:
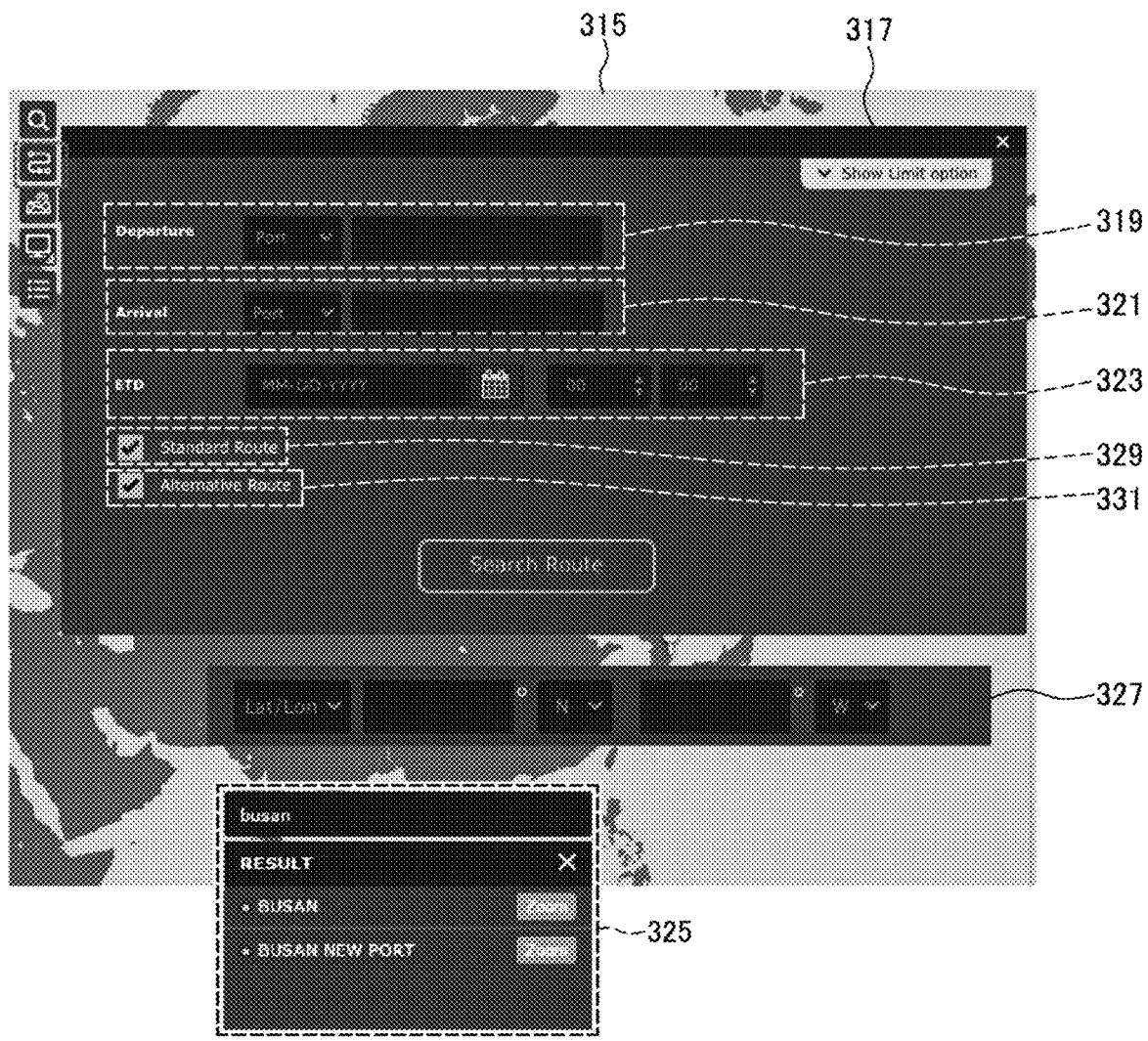

For example, referring to FIG. 3C, the port information receiving unit 210 may receive origin port information 319, destination port information 321, and estimated departure time information 323 input by the user from the user device 100 through a port information input page 317 provided by a ship route information providing site 315.

Herein, the origin port information 319 may be input as a port name of the origin of a ship through a first-type origin port input interface 325 or latitude and longitude information of the origin port through a second-type origin port input interface. Likewise, the destination port information 321 may be input as a port name of the destination of the ship or latitude and longitude information of the destination port in the same way as the origin port information 319.

The port information receiving unit 210 may receive a selective route desired among a standard route 329 or one of alternative routes 331 from the user device 110 to provide the user device 110 with a ship route to be searched based on the origin port information 319, the destination port information 321, and the estimated departure time information 323 as a route corresponding to the standard route 329 or at least one of the alternative routes 331.

Further, the port information receiving unit 210 may receive a signal to select at least one of a standard route, an alternative route, and a user-customized route as a sailing route of the ship from the user device 110. Herein, the standard route may refer to a shortest route regardless of the user's limiting conditions for a route, the alternative route may refer to a route satisfying the user's limiting conditions, and the user-customized route may refer to a route including a stop where the user wants to stop by.

If the user selects the user-customized route, the port information receiving unit 210 may further receive information about the stop in addition to the information about the origin and destination of the ship.

The filtering information receiving unit 220 may receive filtering information including at least one limiting condition from the user device 110. For example, if the user selects the alternative route, the filtering information receiving unit 220 may receive filtering information including at least one limiting condition for searching an alternative route. Herein, the at least one limiting condition may include at least one of, for example, kind of a ship, size of a ship, speed of a ship, wave direction, mean wave height, maximum wave height, wave period, wind direction, wind speed, visibility, atmospheric pressure, and temperature. Even if the user selects the alternative route and the user-customized route, the filtering information receiving unit 220 may receive filtering information for searching a ship route including a stop set between the origin and the destination by the user and satisfying the at least one limiting condition.

Figure 3D:

For example, referring to FIG. 3D, the filtering information receiving unit 220 may receive filtering information including a sailed ship condition 335, a wave height condition 337, a wind speed condition 339, and a wind power condition 341, which are set by the user as conditions for searching an alternative route, from the user device 110 through a limiting condition setting page 333 provided by the ship route information providing site 315. The filtering information receiving unit 220 may store and manage the filtering information received from the user device 110 in a folder of each user device.

Herein, the sailed ship condition 335 may include at least one of the kind of a sailed ship, the size of the ship, and the sailing speed of the ship.

For example, the filtering information receiving unit 220 may receive one kind of ship selected from among a list of multiple kinds of ship, one size of ship selected from among a list of multiple sizes of ship, and one sailing speed of ship selected from among a list of multiple sailing speeds of ship from the user device 110.

The wave height condition 337 may be selected within a predetermined wave height range with a predetermined wave height interval, the wind speed condition 339 may be selected within a predetermined wind speed range with a predetermined wind speed interval, and the wind power condition 341 may be selected within a predetermined wind power range with a predetermined wind power interval.

If the filtering information receiving unit 220 does not receive a filtering option value for at least one of the wave height condition 337, the wind speed condition 339, and the wind power condition 341 from the user device 110, the filtering information receiving unit 220 may set the wave height condition 337, the wind speed condition 339, and the wind power condition 341 as predetermined filtering values.

The coastal weather information generation unit 230 may generate first coastal weather information of a coastal area corresponding to the origin and second coastal weather information of a coastal area corresponding to the destination based on real-time observed values received from the multiple marine numerical weather prediction models 120, respectively. For example, if the coastal weather information generation unit 230 receives desired sailing period information (i.e., a departure period (e.g., September 1 to September 5) and an arrival period (e.g., September 3 to September 7)) from the user device 110, the coastal weather information generation unit 230 may generate first coastal weather information of a costal area corresponding to the origin and second coastal weather information of a coastal area corresponding to the destination for each date included in the desired sailing period. Herein, the first coastal weather information and the second coastal weather information may include multiple kinds of weather information. Each of the multiple kinds of weather information may be information based on a real-time observed value received from a marine numerical weather prediction model 120 allocated to each kind of the weather information and may include, for example, wave direction, mean wave height, maximum wave height, wave period, wind direction, wind speed, visibility, atmospheric pressure, and temperature.

The route determination unit 240 may determine a standard route from the origin to the destination and determine at least one alternative route from the origin to the destination based on the received filtering information. Herein, the at least one alternative route may refer to a route satisfying at least one limiting condition. For example, in the case of a standard route, the route determination unit 240 may determine a shortest route regardless of the filtering information received from the user device 110 as a standard route. In the case of an alternative route, the route determination unit 240 may determine at least one alternative route satisfying the filtering information received from the user device 110. In the case of a user-customized route, the route determination unit 240 may determine a user-customized route from the origin to the destination including a stop as received from the user device 110 and satisfying the filtering information received from the user device 110, user device 110.

The route information transmission unit 250 may transmit the generated first coastal weather information and second coastal weather information to the user device 110. For example, the route information transmission unit 250 may provide the user device 110 with the generated first coastal weather information and second coastal weather information in the form of at least one of text, radar image, table, graph, and image.

The route information transmission unit 250 may transmit information about the standard route and the at least one alternative route to the user device 110 such that the standard route and the at least one alternative route are output on the screen of the user device 110 for comparison.

Figure 3E:
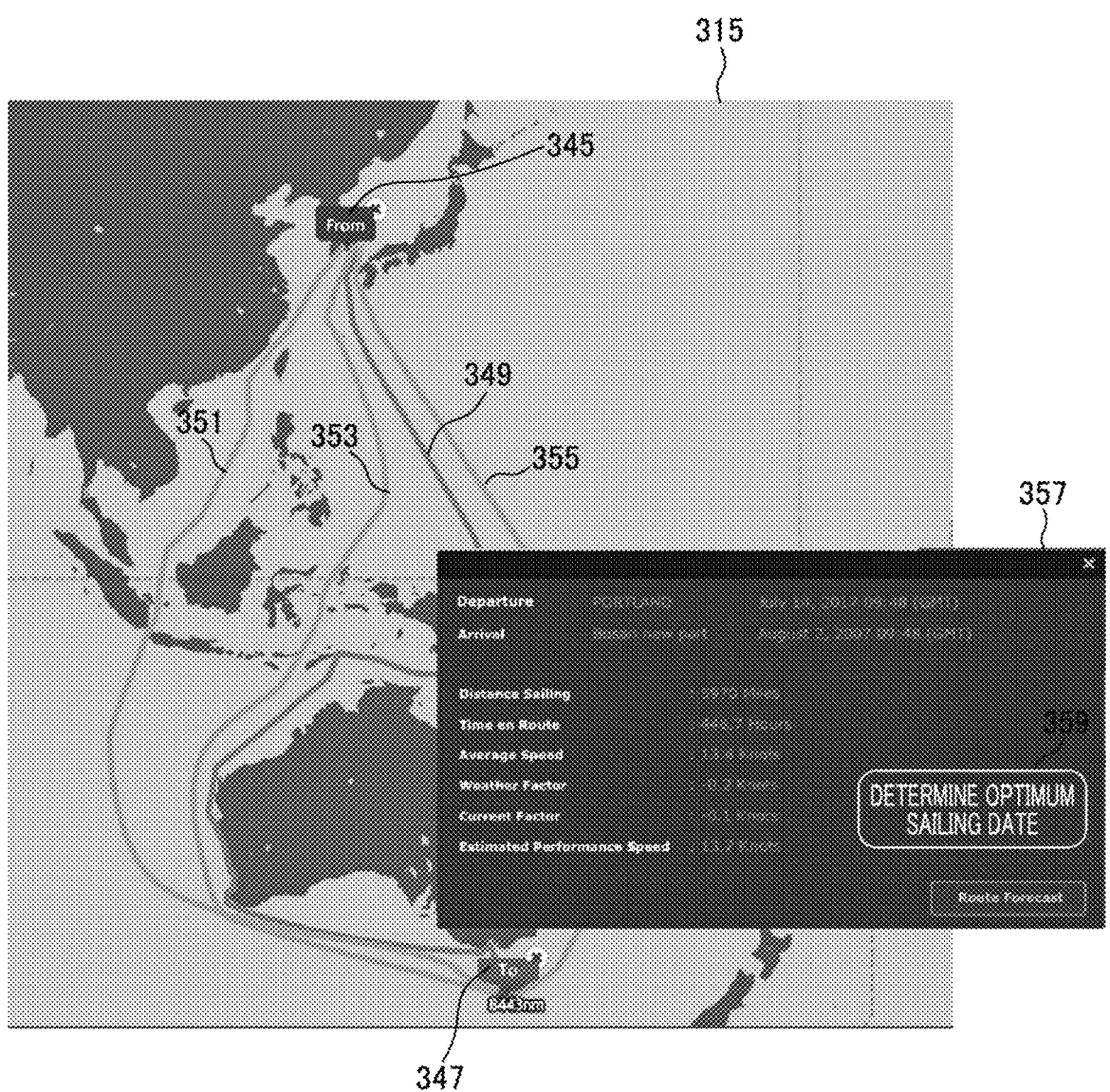
Figure 3G:
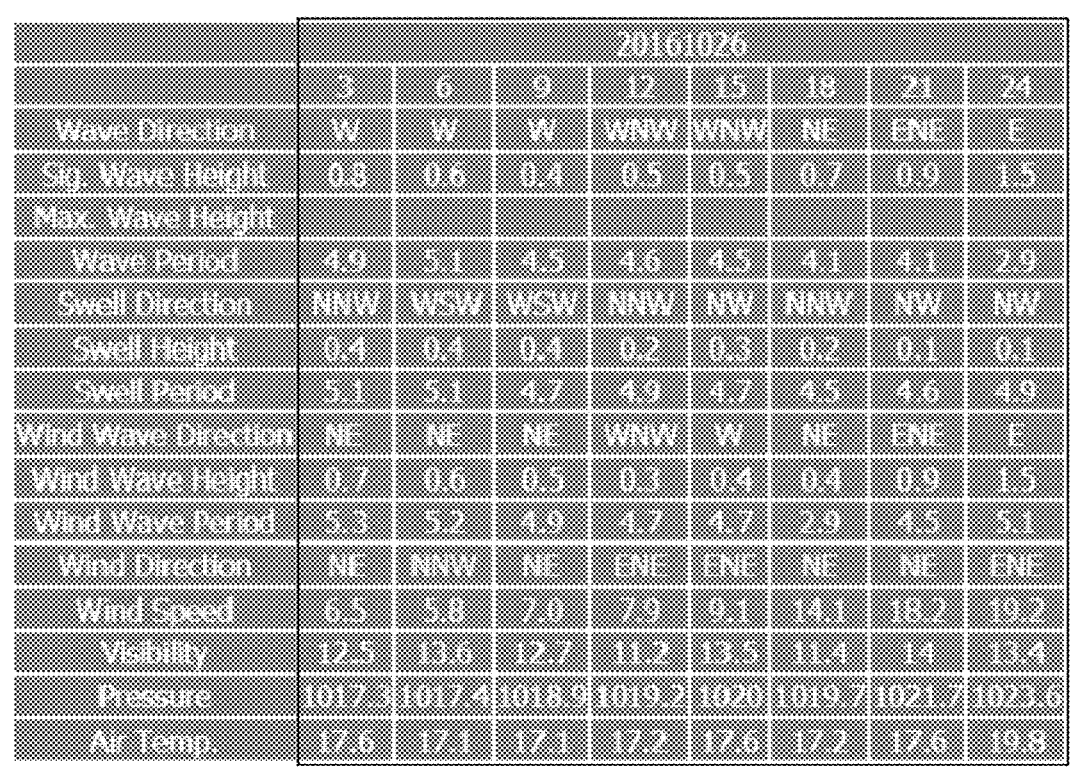
Figure 3H:
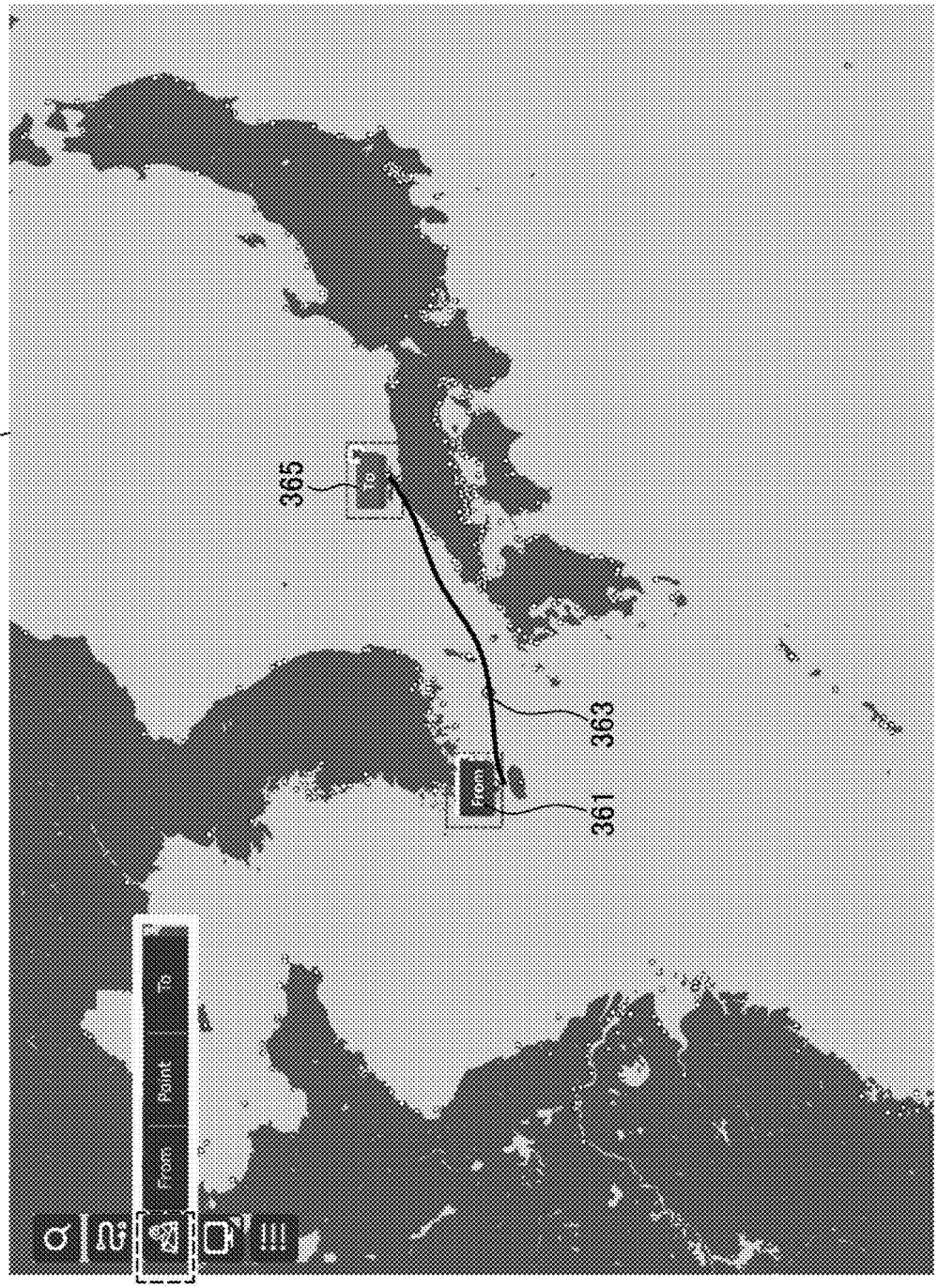

For example, referring to FIG. 3E to FIG. 3G, the information about the standard route and the at least one alternative route may include sailing paths corresponding to a standard route 349 and at least one of alternative routes 351, 353, and 355 from an origin 345 to a destination 347 and sailing information for each sailing path. Herein, sailing information 357 for each sailing path may include origin information (e.g., an origin port name, estimated departure time of a ship), destination information (e.g., a destination port name, estimated arrival times of the ship for the respective routes), estimated sailing distance information and time en route information for each sailing path, average sailing speed of the ship, estimated marine weather information, current marine weather information, and the like.

The route information transmission unit 250 may transmit information about a standard route and at least one alternative route to the user device 110 to display sailing paths corresponding to the standard route 349 and at least one of the alternative routes 351, 353, and 355 on a map and output the sailing information 357 for a sailing path corresponding to a route selected by the user from among the standard route 349 and at least one of the alternative routes 351, 353, and 355 on the map.

The route information transmission unit 250 may transmit first coastal weather information (see FIG. 3F) of a coastal area corresponding to the origin 345 and second coastal weather information (see FIG. 3G) of a coastal area corresponding to the destination 347 for sailing dates (a departure date and an arrival date) set by the user to the user device 110. Otherwise, the route information transmission unit 250 may transmit first coastal weather information (see FIG. 3F) of a coastal area corresponding to the origin 345 and second coastal weather information (see FIG. 3G) of a coastal area corresponding to the destination 347 for each of sailing dates included in a sailing period (a departure period and an arrival period) set by the user to the user device 110. Herein, the first coastal weather information may include weather information about, for example, wave direction, mean wave height, maximum wave height, wave period, wind direction, wind speed, visibility, atmospheric pressure, and temperature for each latitude of the coastal area corresponding to the origin 345. The second coastal weather information may include weather information about, for example, wave direction, mean wave height, maximum wave height, wave period, wind direction, wind speed, visibility, atmospheric pressure, and temperature for each latitude of the coastal area corresponding to the destination 347.

The optimum sailing date determination unit 290 may determine the optimum sailing date based on the first coastal weather information and the second coastal weather information. For example, the optimum sailing date determination unit 290 may determine a date with first coastal weather information and second coastal weather information satisfying a weather limiting condition received from the user device 110 from among the first coastal weather information and second coastal weather information generated for each date included in the desired sailing period received from the user device 110, as the optimum sailing date. For example, referring to FIG. 3E to FIG. 3G, the sailing information 357 for a sailing path corresponding to a route selected by the user from among the standard route 349 and at least one of the alternative routes 351, 353, and 355 may include an optimum sailing date button 359 to determine the optimum sailing date for the selected route. For example, if the route information transmission unit 250 receives input information about the optimum sailing date button 359 for the selected route from the user device 110, the route information transmission unit 250 may determine the optimum sailing date with good coastal weather information based on the first coastal weather information (see FIG. 3F) of the coastal area corresponding to the origin 345 and second coastal weather information (see FIG. 3G) of the coastal area corresponding to the destination 347 and transmit information about the determined optimum sailing date to the user device 110.

The route determination unit 240 may determine a standard route and an alternative route for the optimum sailing date determined by the optimum sailing date determination unit 290. Further, the route determination unit 240 may determine a standard route from the origin to the destination for the optimum sailing date and determine at least one alternative route from the origin to the destination for the optimum sailing date based on the filtering information.

The route information transmission unit 250 may transmit the determined standard route and alternative route for the optimum sailing date to the user device 110. For example, referring to FIG. 3E, if the route information transmission unit 250 receives input information about the optimum sailing date button 359 from the user device 110, the route information transmission unit 250 may provide the user device 110 with the standard route and the alternative route for the optimum sailing date with good coastal weather information.

Meanwhile, if the user selects the user-customized route, the route information transmission unit 250 may transmit information about the user-customized route to the user device 110. Herein, the information about the user-customized route may include, for example, sailing paths corresponding to user-customized routes from the origin to the destination including a stop and sailing information for each sailing path. For example, referring to FIG. 3H, if the route information transmission unit 250 receives an origin 361, a destination 365, and a stop 363 from the user device 110, the route information transmission unit 250 may transmit a sailing path corresponding to a user-customized route from the origin 361 to the destination 365 via the stop 363 and sailing information for the sailing path to the user device 110.

The weather prediction information transmission unit 260 may transmit time-based weather prediction information for at least one of a standard route and at least one alternative route to the user device 110. For example, referring to FIG. 3I, time-based weather prediction information 357 may include multiple kinds of weather information 359 at each unit time, and the multiple kinds of weather information 359 may include, for example, wave direction, mean wave height, maximum wave height, wave period, wind direction, wind speed, visibility, atmospheric pressure, and temperature. Each of the multiple kinds of weather information 359 is generated based on a real-time observed value received from a marine numerical weather prediction model 120 allocated to each kind of the weather information.

If the weather prediction information transmission unit 260 receives a signal to select one of the standard route and the at least one alternative route from the user device 110, the weather prediction information transmission unit 260 may transmit time-based weather prediction information for the selected route to the user device 110.

If any one of multiple weather prediction information for the route selected by the user device 110 from among the standard route and the at least one alternative route does not satisfy a liming condition (a limiting condition included in the filtering information) received from the user device 110, the weather prediction information transmission unit 260 may transmit marker information including a predetermined marker (indicating that the limiting condition is not satisfied) to the user device 110. The predetermined marker may be displayed on the screen of the user device 110 that receives the marker information.

Figure 3I:
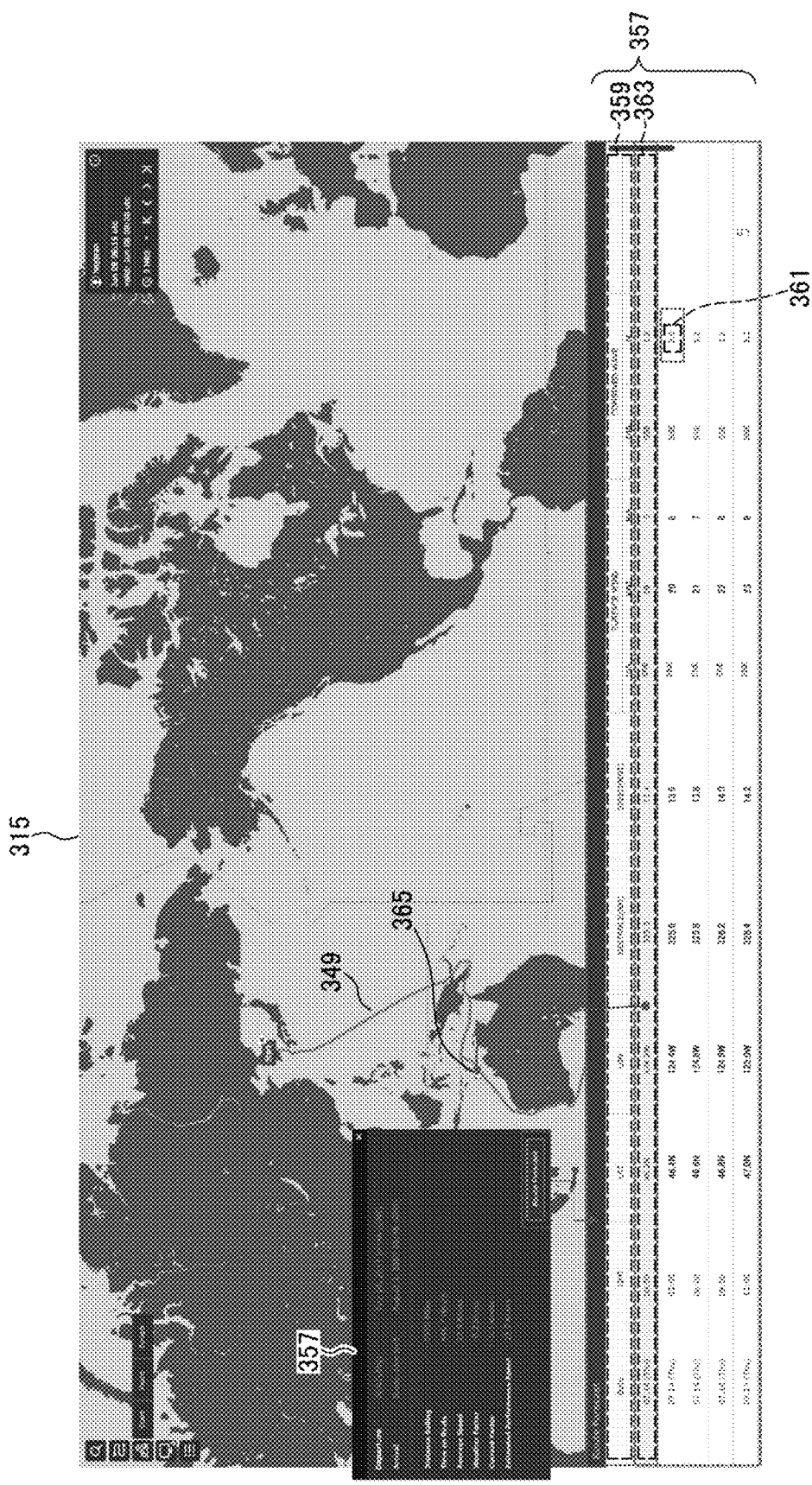

For example, referring to FIG. 3E and FIG. 3I, the weather prediction information transmission unit 260 may transmit the time-based weather prediction information 357 for the route 349, which is selected by the user device 110 from among the standard route 349 and at least one of the alternative routes 351, 353, and 355 provided to the user device 110, to the user device 110. Herein, if the time-based weather prediction information 357 for the selected route 349 includes weather information that does not satisfy at least one limiting condition (e.g., speed, wave height, wind speed, wind power, etc.) included in the filtering information for an alternative route, a predetermined marker 361 may be displayed on the weather information that does not satisfy the limiting condition.

If the weather prediction information transmission unit 260 receives weather prediction information selected by the user device 110 from among the time-based weather prediction information 357 for the selected route 349, the weather prediction information transmission unit 260 may transmit time-based location information to the user device 110 to output a location corresponding to each weather information at each unit time for the selected route 349 on a sailing path of the route 349. A location 365 corresponding to weather prediction information 363 selected by the user device 110 from among the time-based weather prediction information 357 for the selected route 349 may be output on the sailing path of the route 349.

Meanwhile, it would be understood by those skilled in the art that each of the observed value receiving unit 200, the port information receiving unit 210, the filtering information receiving unit 220, the coastal weather information generation unit 230, the route determination unit 240, the route information transmission unit 250, the weather prediction information transmission unit 260, the historical data collection unit 270, the historical data learning unit 280, the prediction accuracy rate calculation unit 282, the marine numerical weather prediction model allocation unit 284, and the optimum sailing date determination unit 290 can be implemented separately or in combination with one another.

Figure 4:
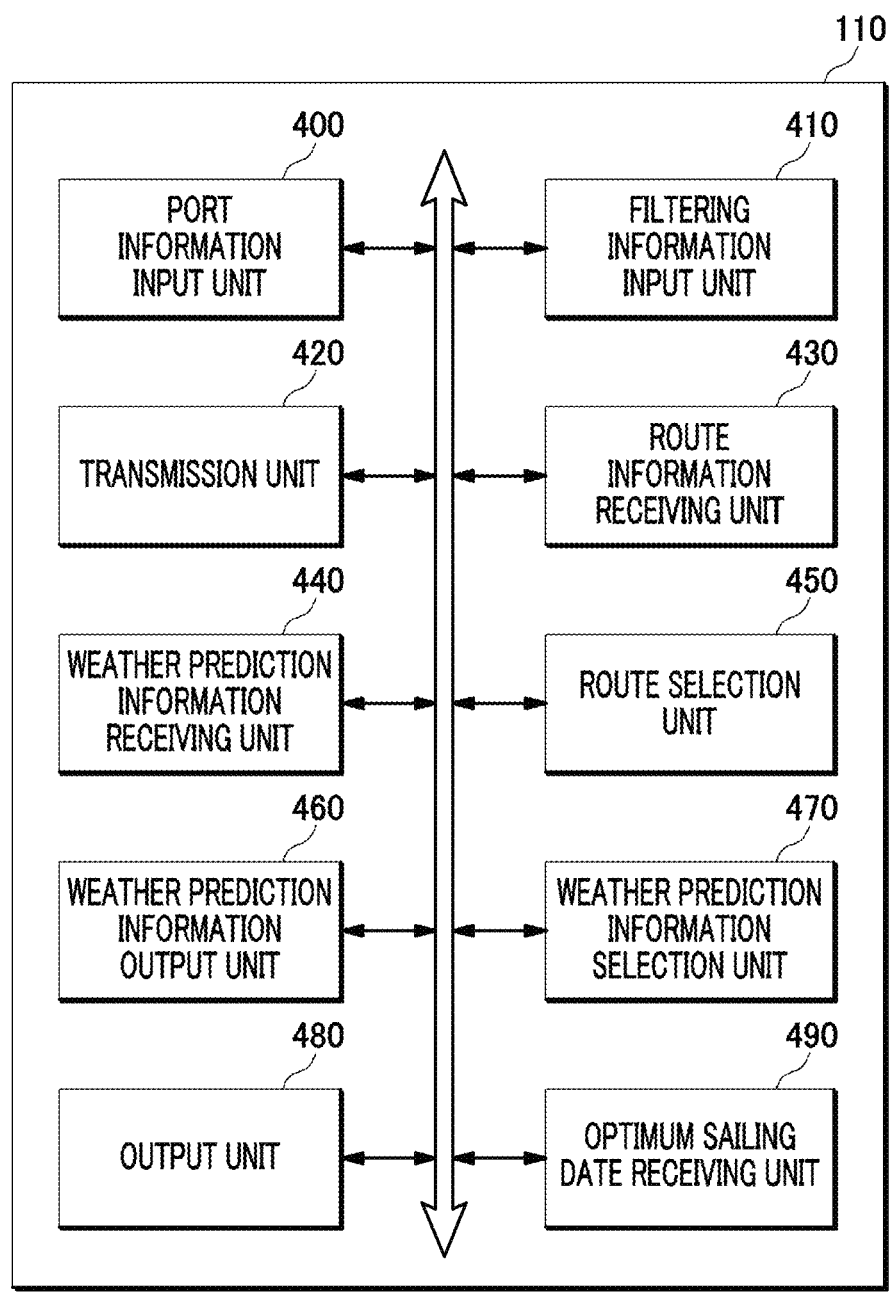
FIG. 4 is a block diagram showing the user device illustrated in FIG. 1 in accordance with various embodiments described herein.

FIG. 4 is a block diagram showing the user device 110 illustrated in FIG. 1 in accordance with an embodiment of the present disclosure.

Referring to FIG. 4, the user device 110 may include a port information input unit 400, a filtering information input unit 410, a transmission unit 420, a route information receiving unit 430, a weather prediction information receiving unit 440, a route selection unit 450, a weather prediction information output unit 460, a weather prediction information selection unit 470, an output unit 480, and an optimum sailing date receiving unit 490. However, the user device 110 illustrated in FIG. 4 is just an embodiment of the present disclosure and can be modified in various ways based on its components illustrated in FIG. 4.

The port information input unit 400 may receive information about the origin and destination of a ship through a ship route information providing site or a ship route providing application. For example, the port information input unit 400 may receive origin port information of the ship (e.g., a port name of the origin or latitude and longitude information of the origin port), destination port information of the ship (e.g., a port name of the destination or latitude and longitude information of the destination port), and estimated departure time information of the ship through a port information input page provided by a ship route information providing site which the user device 110 accesses.

The port information input unit 400 may receive at least one of a standard route, an alternative route, and a user-customized route selected by the user from among ship routes to be searched based on the origin port information of the ship, the destination port information of the ship, and the estimated departure time information of the ship which are input by the user. Herein, the standard route may refer to a shortest route regardless of the user's limiting conditions for a route, the alternative route may refer to a route satisfying the user's limiting conditions, and the user-customized route may refer to a route including a stop where the user wants to stop by.

If the user selects the user-customized route, the port information input unit 400 may further receive information about the stop in addition to the information about the origin and destination of the ship.

The filtering information input unit 410 may receive filtering information including at least one limiting condition. Specifically, if the user selects the alternative route as a route to be provided to the user, the filtering information input unit 410 may receive filtering information corresponding to a condition for searching an alternative route for safe sailing from the user. Herein, the at least one limiting condition may include a preset input value for at least one of, for example, kind of a ship, size of a ship, speed of a ship, wave direction, mean wave height, maximum wave height, wave period, wind direction, wind speed, visibility, atmospheric pressure, and temperature. Even if the user selects the alternative route and the user-customized route, the filtering information input unit 410 may receive filtering information for searching a route including a stop set between the origin and the destination by the user and satisfying the at least one limiting condition.

The transmission unit 420 may transmit information about the origin and destination of the ship and filtering information to the ship route information providing server 100. For example, if the user selects only the standard route, the transmission unit 420 may transmit information about the origin and destination input by the user to the ship route information providing server 100, and if the user selects the standard route and the alternative route (or only the alternative route), the transmission unit 420 may transmit information about the origin and destination input by the user and filtering information for the alternative route to the ship route information providing server 100. Otherwise, even if the user selects only the standard route or the user-customized route, the transmission unit 420 may transmit filtering information to the ship route information providing server 100.

If the user selects the user-customized route, the transmission unit 420 may transmit information about the stop with information about the origin and destination of the ship to the ship route information providing server 100.

The route information receiving unit 430 may receive first coastal weather information of a coastal area corresponding to the origin and second coastal weather information of a coastal area corresponding to the destination from the ship route information providing server 100. Herein, the first coastal weather information may include weather information about, for example, wave direction, mean wave height, maximum wave height, wave period, wind direction, wind speed, visibility, atmospheric pressure, and temperature for each latitude of the coastal area corresponding to the origin. The second coastal weather information may include weather information about, for example, wave direction, mean wave height, maximum wave height, wave period, wind direction, wind speed, visibility, atmospheric pressure, and temperature for each latitude of the coastal area corresponding to the destination. Each of the multiple kinds of weather information included in the first coastal weather information and the second coastal weather information may be generated based on a real-time observed value received from a marine numerical weather prediction model allocated to each kind of the weather information.

For example, the route information receiving unit 430 may receive first coastal weather information of a coastal area corresponding to the origin and second coastal weather information of a coastal area corresponding to the destination for each of sailing dates included in a sailing period (a departure period and an arrival period) set by the user from the ship route information providing server 100. Otherwise, the route information receiving unit 430 may receive first coastal weather information of a coastal area corresponding to the origin and second coastal weather information of a coastal area corresponding to the destination from the ship route information providing server 100 based on estimated departure time information of the ship input by the user.

The optimum sailing date receiving unit 490 may receive the optimum sailing date determined based on the first coastal weather information and the second coastal weather information from the ship route information providing server 100. For example, the optimum sailing date receiving unit 490 may receive the optimum sailing date with first coastal weather information and second coastal weather information satisfying the user's limiting condition from among the first coastal weather information and second coastal weather information for each date included in the user's desired sailing period, from the ship route information providing server 100. For example, in case of sailing along the standard route and at least one alternative route, the optimum sailing date receiving unit 490 may receive the optimum sailing dates (a departure date and an arrival date) with optimum weather conditions from the ship route information providing server 100.

The route information receiving unit 430 may receive information about the standard route and at least one alternative route from the origin to the destination from the ship route information providing server 100. Herein, the information about the standard route and at least one alternative route may include sailing paths corresponding to the standard route and at least one alternative route from the origin to the destination and sailing information for each sailing path. Herein, the sailing information for each sailing path may include origin information (e.g., an origin port name, estimated departure time of a ship), destination information (e.g., a destination port name, estimated arrival times of the ship for the respective routes), estimated sailing distance information and time en route information for each sailing path, average sailing speed of the ship, estimated marine weather information, current marine weather information, and the like.

Herein, the at least one alternative route may refer to a route satisfying the at least one limiting condition included in the filtering information for an alternative route input by the user and the standard route may refer to a shortest route regardless of the at least one limiting condition included in the filtering information.

Further, the route information receiving unit 430 may receive information about a standard route and an alternative route for the optimum sailing date from the ship route information providing server 100. Specifically, the route information receiving unit 430 may receive information about a standard route from the origin to the destination for the optimum sailing date and information about at least one alternative route from the origin to the destination for the optimum sailing date based on the filtering information from the ship route information providing server 100.

The output unit 480 may output a standard route and at least one alternative route. Further, the output unit 480 may output the optimum sailing date and a standard route and at least one alternative route for the optimum sailing date. For example, the output unit 480 may display sailing paths corresponding to a standard route and at least one alternative route on a map and output sailing information for a sailing path corresponding to a route selected by the user from among the standard route and the at least one alternative route on the map.

For example, the output unit 480 may compare and output the optimum sailing date and the standard route and the at least one alternative route for the optimum sailing date on the screen of the user device 110.

The output unit 480 may output the optimum sailing date for a route selected by the user from among a standard route and at least one alternative route with a sailing path corresponding to the selected route on the map.

The route selection unit 450 may receive a route selected by the user from among a standard route and at least one alternative route. For example, the route selection unit 450 may receive a route selected by the user from among a standard route and at least one alternative route corresponding to respective multiple sailing paths output on the map.

The weather prediction information receiving unit 440 may receive time-based weather prediction information for at least one of a standard route and at least one alternative route from the ship route information providing server 100. Herein, the time-based weather prediction information may include multiple kinds of weather information at each unit time. Each of the multiple kinds of weather information may be based on a real-time observed value received from a marine numerical weather prediction model allocated to each kind of the weather information. The multiple kinds of weather information may include, for example, wave direction, mean wave height, maximum wave height, wave period, wind direction, wind speed, visibility, atmospheric pressure, and temperature.

The weather prediction information output unit 460 may output time-based weather prediction information for a route selected by the user from among a standard route and at least one alternative route. For example, the weather prediction information output unit 460 may maintain only a sailing path corresponding to the route selected by the user from among the standard route and the at least one alternative route corresponding to the respective multiple sailing paths output on the map and delete the other sailing paths corresponding to the unselected routes and then output time-based weather prediction information for the selected route.

The weather prediction information output unit 460 may output information indicative of whether or not the time-based weather prediction information for the selected route satisfies the filtering information for an alternative route. For example, the weather prediction information output unit 460 may indicate attribute information that does not satisfy the at least one limiting condition (e.g., speed, wave height, wind speed, and wind power) included in the filtering information for an alternative route among weather information for the selected route with a predetermined marker.

The weather prediction information selection unit 470 may receive one kind of weather information selected by the user from among the time-based weather prediction information (i.e., weather information at each unit time) for the selected route.

The output unit 480 may output a location corresponding to each weather information at each unit time for the selected route on a sailing path of the route. For example, the output unit 480 may output a location corresponding to the selected weather information for the selected route on the sailing path of the selected route.

If the user selects the user-customized route, the route information receiving unit 430 may receive information about a user-customized route from the origin to the destination including at least one stop input by the user from the ship route information providing server 100.

Further, the route information receiving unit 430 may receive information about a user-customized route for the optimum sailing date from the ship route information providing server 100. Specifically, the route information receiving unit 430 may receive information about a user-customized route from the origin to the destination including at least one stop input by the user for the optimum sailing date from the ship route information providing server 100.

Furthermore, the route information receiving unit 430 may receive information about a user-customized route from the origin to the destination including at least one stop input by the user for the optimum sailing date based on the filtering information from the ship route information providing server 100.

The weather prediction information receiving unit 440 may receive time-based weather prediction information for the user-customized route from the ship route information providing server 100.

The output unit 480 may output the user-customized route received from the ship route information providing server 100 on the map. Further, the output unit 480 may output a user-customized route for the optimum sailing date. For example, if the user inputs the origin, the destination, and a stop, the output unit 480 may output a sailing path corresponding to a user-customized route from the origin to the destination including the stop on the map. Further, the output unit 480 may output time-based weather prediction information for the user-customized route and output a location corresponding to weather information selected from the time-based weather prediction information on a sailing path of the user-customized route.

Meanwhile, it would be understood by those skilled in the art that each of the port information input unit 400, the filtering information input unit 410, the transmission unit 420, the route information receiving unit 430, the weather prediction information receiving unit 440, the route selection unit 450, the weather prediction information output unit 460, the weather prediction information selection unit 470, the output unit 480, and the optimum sailing date receiving unit 490 can be implemented separately or in combination with one another.

Figure 5:
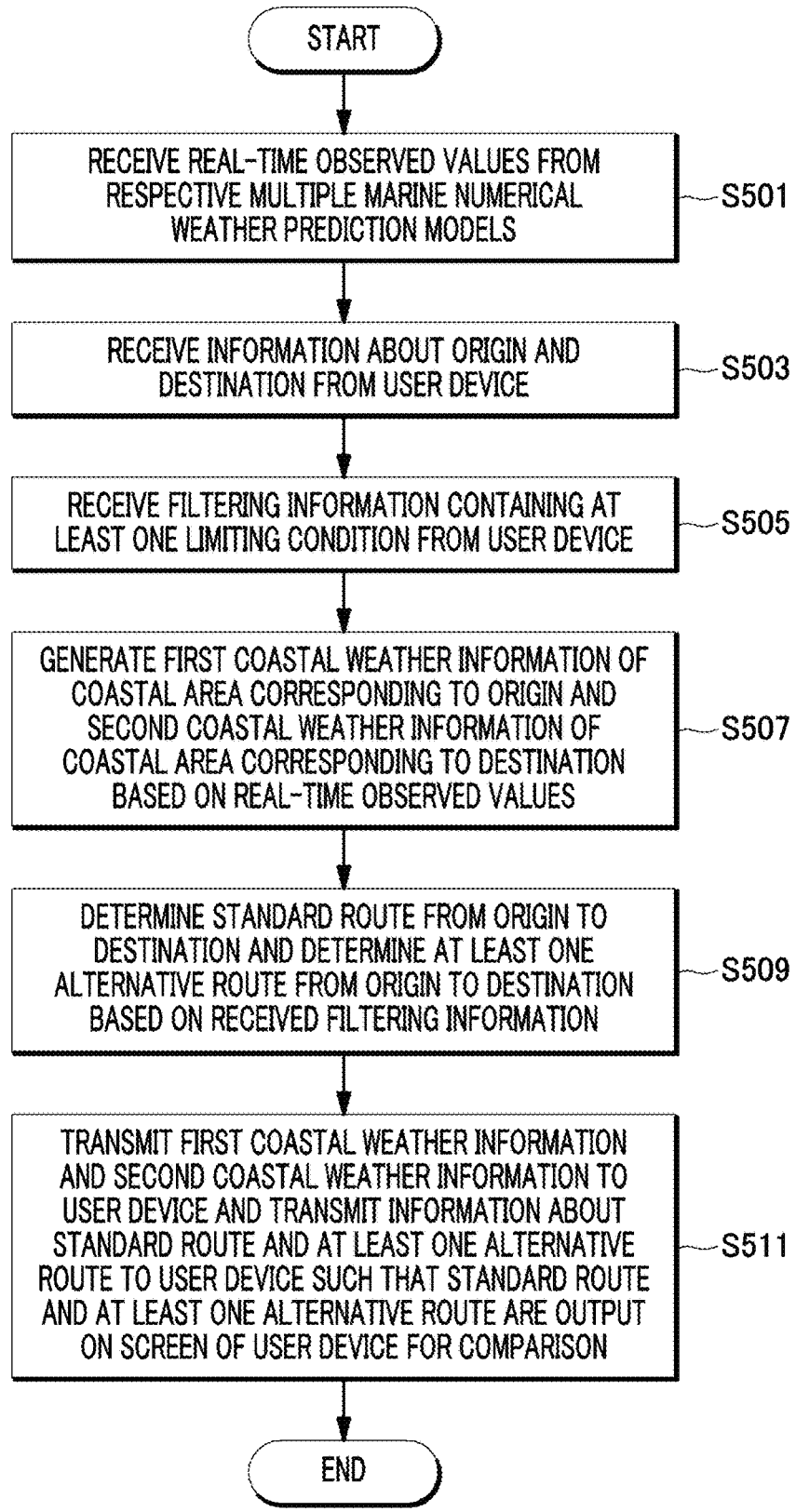
FIG. 5 is a flowchart showing a method for proving route information for ship in accordance with various embodiments described herein.

FIG. 5 is a flowchart showing a method for proving route information for ship in accordance with an embodiment of the present disclosure.

A method for proving route information for ship according to an embodiment illustrated in FIG. 5 includes the processes time-sequentially performed by the ship route information providing server 100 and the user device 110 according to the embodiment illustrated in FIG. 1 to FIG. 4. Therefore, descriptions of the processes performed by the ship route information providing server 100 and the user device 110 illustrated in FIG. 1 to FIG. 4 may be applied to the method for proving route information for ship according to the embodiment illustrated in FIG. 5, even though they are omitted hereinafter.

Referring to FIG. 5, in S501, the ship route information providing server 100 may receive real-time observed values from the multiple marine numerical weather prediction models 120, respectively.

In S503, the ship route information providing server 100 may receive information about an origin and a destination from the user device 110.

In S505, the ship route information providing server 100 may receive filtering information including at least one limiting condition from the user device 110. Herein, the at least one limiting condition may include at least one of, for example, kind of a ship, size of a ship, speed of a ship, wave height, wind speed, and wind power.

In S507, the ship route information providing server 100 may generate first coastal weather information of a coastal area corresponding to the origin and second coastal weather information of a coastal area corresponding to the destination based on the real-time observed values.

In S509, the ship route information providing server 100 may determine a standard route from the origin to the destination and determine at least one alternative route from the origin to the destination based on the received filtering information. Herein, the standard route may refer to a shortest route regardless of the at least one limiting condition and the at least one alternative route may refer to a route satisfying the at least one limiting condition.

In S511, the ship route information providing server 100 may transmit the first coastal weather information and the second coastal weather information to the user device 110 and transmit information about the standard route and the at least one alternative route to the user device 110 such that the standard route and the at least one alternative route are output on the screen of the user device 110 for comparison.

In the descriptions above, the processes S501 to S511 may be divided into additional processes or combined into fewer processes depending on an embodiment. In addition, some of the processes may be omitted and the sequence of the processes may be changed if necessary.

The embodiment of the present disclosure can be embodied in a storage medium including instruction codes executable by a computer such as a program module executed by the computer. A computer-readable medium can be any usable medium which can be accessed by the computer and includes all volatile/non-volatile and removable/non-removable media. Further, the computer-readable medium may include all computer storage media. The computer storage media include all volatile/non-volatile and removable/non-removable media embodied by a certain method or technology for storing information such as computer-readable instruction code, a data structure, a program module or other data.

The above description of the present disclosure is provided for the purpose of illustration, and it would be understood by a person with ordinary skill in the art that various changes and modifications may be made without changing technical conception and essential features of the present disclosure. Thus, it is clear that the above-described embodiments are illustrative in all aspects and do not limit the present disclosure. For example, each component described to be of a single type can be implemented in a distributed manner. Likewise, components described to be distributed can be implemented in a combined manner.

The scope of the present disclosure is defined by the following claims rather than by the detailed description of the embodiment. It shall be understood that all modifications and embodiments conceived from the meaning and scope of the claims and their equivalents are included in the scope of the present disclosure.

EXPLANATION OF REFERENCE NUMERALS

100: Ship route information providing server
110: User device

I claim:

1. A method for providing route information for ship including coastal weather information, comprising:
   receiving real-time observed values from multiple marine numerical weather prediction models, respectively;
   receiving information about an origin and a destination from a user device;
   providing the user device with a limiting condition setting page for setting at least one limiting condition to search at least one alternative route and receiving filtering information including the at least one limiting condition from the user device through the limiting condition setting page before generating a standard route and the at least one alternative route;
   generating first coastal weather information of a coastal area corresponding to the origin and second coastal weather information of a coastal area corresponding to the destination based on the real-time observed values;
   determining the standard route from the origin to the destination and determining the at least one alternative route from the origin to the destination based on the received filtering information; and transmitting the first coastal weather information and the second coastal weather information to the user device and transmitting information about the standard route and the at least one alternative route to the user device such that the standard route and the at least one alternative route are output on a screen of the user device for comparison, wherein the multiple marine numerical weather prediction models include a CoWW3 model (Coastal Wave Model), a GoWW3 model (Global Wave Model), and a WW3 model (WaveWatch3), wherein the at least one alternative route is a route satisfying the at least one limiting condition, wherein the at least one limiting condition includes kind of a ship, size of a ship, speed of a ship, wave height, wind speed, and wind power, and wherein the standard route is a shortest route regardless of the at least one limiting condition, the method further includes:

collecting historical weather data from each of the multiple marine numerical weather prediction models: and learning the historical weather data collected from each of the multiple marine numerical weather prediction models and allocating one of the multiple marine numerical weather prediction models to each kind of weather information, wherein each of the first coastal weather information and the second coastal weather information include multiple kinds of weather information, wherein the multiple kinds of weather information include wave direction, mean wave height, maximum wave height, wave period, wind direction, wind speed, visibility, atmospheric pressure, and temperature, and wherein each of the multiple kinds of weather information is based on the real-time observed values received from a marine numerical weather prediction model allocated to each kind of the weather information.

2. The method of claim 1, further comprising:
transmitting time-based weather prediction information for at least one of the standard route and the at least one alternative route to the user device.

3. The method of claim 2,
wherein the transmitting of the time-based weather prediction information for the at least one of the standard route and the at least one alternative route to the user device includes:
receiving a signal to select one of the standard route and the at least one alternative route from the user device; and
transmitting time-based weather prediction information for the selected route to the user device.

4. The method of claim 3,
wherein if any one of the multiple weather prediction information does not satisfy the limiting condition, a predetermined marker is displayed on the user device.

5. The method of claim 2,
wherein the learning of the historical weather data to allocate one of the multiple marine numerical weather prediction models to each kind of the weather information includes:
calculating a prediction accuracy rate for each kind of the weather information with respect to each of the multiple marine numerical weather prediction models; and
allocating a marine numerical weather prediction model with the highest prediction accuracy rate for each kind of the weather information.

6. The method of claim 5,
wherein the time-based weather prediction information includes the weather information at each unit time, and
each of the weather information is based on the real-time observed values received from the marine numerical weather prediction model allocated to each kind of the weather information.

7. The method of claim 1, further comprising:
determining an optimum sailing date based on the first coastal weather information and the second coastal weather information;
determining the standard route and the at least one alternative route for the optimum sailing date; and
transmitting the determined standard route and the at least one alternative route for the optimum sailing date to the user device.

8. A server for providing route information for ship including coastal weather information, comprising:
an observed value receiving unit configured to receive real-time observed values from multiple marine numerical weather prediction models, respectively;
a port information receiving unit configured to receive information about an origin and a destination from a user device;
a filtering information input unit configured to provide the user device with a limiting condition setting page for setting at least one limiting condition to search at least one alternative route and receive filtering information including the at least one limiting condition from the user device through the limiting condition setting page before generating a standard route and the at least one alternative route;
a coastal weather information generation unit configured to generate first coastal weather information of a coastal area corresponding to the origin and second coastal weather information of a coastal area corresponding to the destination based on the real-time observed values;
a route determination unit configured to determine the standard route from the origin to the destination and determine the at least one alternative route from the origin to the destination based on the received filtering information; and
a route information transmission unit configured to transmit the first coastal weather information and the second coastal weather information to the user device and transmit information about the standard route and the at least one alternative route to the user device such that the standard route and the at least one alternative route are output on a screen of the user device for comparison,
wherein the multiple marine numerical weather prediction models include a CoWW3 model (Coastal Wave Model), a GoWW3 model (Global Wave Model), and a WW3 model (WaveWatch3),
wherein the at least one alternative route is a route satisfying the at least one limiting condition
the at least one limiting condition includes kind of a ship, size of a ship, speed of a ship, wave height, wind speed, and wind power, and
the standard route is a shortest route regardless of the at least one limiting condition, the server further includes:

a historical data collection unit configured to collect historical weather data from each of the multiple marine numerical weather prediction models; and a historical data learning unit configured to learn the historical weather data collected from each of the multiple marine numerical weather prediction models and allocate one of the multiple marine numerical weather prediction models to each kind of weather information, wherein each of the first coastal weather information and the second coastal weather information include multiple kinds of weather information, wherein the multiple kinds of weather information include wave direction, mean wave height, maximum wave height, wave period, wind direction, wind speed, visibility, atmospheric pressure, and temperature, and wherein each of the multiple kinds of weather information is based on the real-time observed values received from a marine numerical weather prediction model allocated to each kind of the weather information.

9. The server of claim 8, further comprising:

a weather prediction information transmission unit configured to transmit time-based weather prediction information for at least one of the standard route and the at least one alternative route to the user device.

10. The server of claim 9, wherein the weather prediction information transmission unit receives a signal to select one of the standard route and the at least one alternative route from the user device and transmits time-based weather prediction information for the selected route to the user device.

11. The server of claim 10, wherein if any one of the multiple weather prediction information does not satisfy the limiting condition, a predetermined marker is displayed on the user device.

12. The server of claim 9, wherein the historical data learning unit includes:

a prediction accuracy rate calculation unit configured to calculate a prediction accuracy rate for each kind of the weather information with respect to each of the multiple marine numerical weather prediction models; and a marine numerical weather prediction model allocation unit configured to allocate a marine numerical weather prediction model with the highest prediction accuracy rate for each kind of the weather information.

13. The server of claim 12, wherein the time-based weather prediction information includes the weather information at each unit time, and each of the weather information is based on the real-time observed values received from the marine numerical weather prediction model allocated to each kind of the weather information.

14. The server of claim 8, further comprising:

an optimum sailing date determination unit configured to determine an optimum sailing date based on the first coastal weather information and the second coastal weather information, wherein the route determination unit determines the standard route and the at least one alternative route for the optimum sailing date, and the route information transmission unit transmits the determined standard route and the at least one alternative route for the optimum sailing date to the user device.

* * * * *